United States Patent
Harada et al.

(10) Patent No.: US 6,858,100 B2
(45) Date of Patent: Feb. 22, 2005

(54) ROLLING BEARING

(75) Inventors: Hisashi Harada, Osaka (JP); Masao Goto, Osaka (JP); Hajime Tazumi, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 2 days.

(21) Appl. No.: 10/200,133

(22) Filed: Jul. 23, 2002

(65) Prior Publication Data

US 2003/0029525 A1 Feb. 13, 2003

(30) Foreign Application Priority Data

Jul. 24, 2001 (JP) ..................................... P2001-222442

(51) Int. Cl.[7] .......................... C22C 38/00; F16C 33/00
(52) U.S. Cl. .................. 148/320; 148/328; 148/906; 148/318; 148/319; 384/912; 384/625
(58) Field of Search ................................ 148/320, 328, 148/906, 319, 318; 384/625, 912

(56) References Cited

U.S. PATENT DOCUMENTS

| | | | |
|---|---|---|---|
| 5,336,338 A | 8/1994 | Toda | 148/319 |
| 6,095,692 A | 8/2000 | Takemura | |
| 6,197,128 B1 | 3/2001 | Maeda | |

FOREIGN PATENT DOCUMENTS

| | | |
|---|---|---|
| DE | 199 60 235 A 1 | 7/2000 |
| EP | WO 98/41663 | 9/1998 |
| EP | 0 971 141 A1 | 1/2000 |
| FR | 2 098 643 A | 3/1972 |
| JP | 9-177789 | 7/1997 |
| JP | 2000-161362 | 6/2000 |

*Primary Examiner*—Deborah Yee
(74) *Attorney, Agent, or Firm*—McGinn & Gibb, PLLC

(57) ABSTRACT

A rolling bearing including a rolling element made of steel is provided. The rolling element has a hardness of 620 to 750 HV in its interior. The rolling element is so constructed that the hardest point may exist within a depth of 10% of its diameter from a rolling contact surface of the rolling element, and that the hardness at this point is made higher by 20 to 150 HV than the hardness in the interior.

14 Claims, 1 Drawing Sheet

ROLLING BEARING

BACKGROUND OF THE INVENTION

The present invention relates to a rolling bearing including a rolling element made of steel, and adapted to be used under severe conditions such as high temperature, high speed, high load, high vibration, in for example, a vehicle alternator of an engine auxiliary equipment, a compressor for a vehicle air conditioner, a water pump, etc.

As the rolling bearing of this type, the applicant has already proposed a rolling bearing having a rolling element composed of a steel ball which is imparted with compression residual stress on its surface (Japanese Publication No. JP-A-2000-161362 of unexamined patent application). The rolling element of this rolling bearing is produced in the following manner. After a semi-finished product having a shape close to a finished product has been formed, the semi-finished product is subjected to heat treatments such as annealing and tempering. Then, the heat treated semi-finished product is putted into a rotary container and the rotary container is rotated, and therefore, a surface hardening treatment is applied to the semi-finished product to impart the compression residual stress. Thereafter, a finishing treatment such as polishing is applied to it, thereby obtaining the finished product.

However, in the rolling element of the conventional rolling bearing, after distortion had been given to the interior by subjecting the semi-finished product to the heat treatments, the surface hardening treatment has been conducted to impart the compression residual stress. Accordingly, there has been a fear that when this rolling bearing is employed in a vehicle alternator, exfoliation may occur starting from a stress distorted portion. Moreover, there has been such an anxiety that there are variations in degree of the surface hardening treatment, and when the degree of the surface hardening treatment is too strong, a surface area of the rolling element may become fragile to shorten its rolling life, whereas with too weak degree of the surface hardening treatment, adequate toughness may not be obtained to afford sufficient strength against deformation or crush. In particular, in case where non-metal inclusions such as alumina, titanium nitride, and spherical carbide having high hardness and high elasticity have large particle diameters, occurrence of fragileness and cracks will be promoted, when the degree of the surface hardening treatment is too strong.

SUMMARY OF THE INVENTION

An object of the present invention is to solve the above described problems and to provide a rolling bearing which can enjoy a long life, even though it is used under severe conditions such as high temperature, high speed, high load, and high vibration.

A rolling bearing according to the first aspect of the invention is the rolling bearing including a rolling element made of steel, characterized in that the rolling element has a hardness of 620 to 750 HV in its interior, and the hardest point exists within a depth of 10% of its diameter from a rolling contact surface of the rolling element, and that the hardness at this point is made higher by 20 to 150 HV than the hardness in the interior.

The reason why the hardness in the interior of the rolling element is restricted to 620 to 750 HV is because with the hardness lower than 620 HV, rolling fatigue life will be decreased not only under severe conditions such as high temperature, high speed, high load, and high vibration but also under ordinary conditions for use, whereas with the hardness higher than 750 HV, an impact value will be lowered and the rolling fatigue life will be decreased, when a shock load is exerted between'the rolling element and a bearing wheel under the high speed and high vibration conditions. Moreover, the reason why the hardest point exists within the depth of 10% of the diameter from the rolling contact surface of the rolling element, and the hardness at this point is made higher by 20 to 150 HV than the hardness in the interior is as follows; Specifically, the surface hardening treatment is applied to the rolling element after the heat treatments, enabling the surface hardness to be higher than the interior hardness. Extent of a rise of the hardness from the interior hardness will be varied according to the degree of the surface hardening treatment. In case where the extent of the rise of the hardness is large, distortion of the surface will become large, and grating defects introduced by the surface hardening treatment will be increased. As the results, there is such an anxiety that exfoliation may occur starting from the stress distorted portion. On the other hand, in case where the extent of the rise of the hardness is small, there is such an anxiety that an adequate toughness cannot be obtained, and strength against deformation or crush during production and use may become insufficient. In view of such circumstances, 20 to 150 HV has been selected as an adequate range of the extent of the rise of the surface hardness from the interior hardness. It is to be noted that the rolling element includes both a ball and a roller.

According to the rolling bearing of the first aspect of the invention, because the rolling bearing is constructed as described above, occurrence of exfoliation in the rolling element can be prevented while the surface of the rolling element can be prevented from becoming fragile. As the results, the useful life will be prolonged even when the rolling bearing is used under the severe conditions such as high temperature, high speed, high load, and high vibration. In addition, the strength of the rolling element against deformation or crush will be improved.

The rolling bearing of the first aspect of the invention is produced, for example, in the following manner; Specifically, a semi-finished product having a shape close to a finished product is formed according to JIS SUJ2, and the semi-finished product is subjected to heat treatments including annealing and tempering. The annealing is conducted by heating it for 30 to 60 minutes to a temperature of 830 to 870° C., and thereafter, by rapidly cooling. The tempering is conducted by maintaining it for one or two hours at a temperature of 180 to 250° C. In case where the tempering temperature is higher than 180° C., stability of composition against fatigue under the high speed and high vibration conditions will be improved, but as the tempering temperature is raised, the hardness may be lowered, and there is such an anxiety that the rolling fatigue life may be decreased. Thus, an upper limit of the tempering temperature is set to be 250° C. Then, the heat treated semi-finished product is subjected to a surface hardening treatment by a cold process such as barreling. Thereafter, a finishing treatment such as polishing is conducted thereby to obtain the finished product of the rolling element.

The rolling bearing according to a second aspect of the invention is characterized in that in the first aspect of the invention, the rolling element contains alumina and titanium nitride respectively having the largest diameter of 30 μm or less. Provided that the largest diameter of the alumina and titanium nitride is 30 μm or less, occurrence of fragileness and cracks can be depressed, even though the degree of the surface hardening treatment is rather strong.

The rolling bearing according to a third aspect of the invention is characterized in that in the first or second aspect of the invention, the rolling element contains spherical carbide having the largest diameter of 0.5 μm or less. Provided that the largest diameter of the spherical carbide is 0.5 μm or less, occurrence of fragileness and cracks can be depressed, even though the degree of the surface hardening treatment is rather strong.

The rolling bearing of a fourth aspect of the invention is characterized in that in the first, second and third aspect of the invention, a tempering treatment is applied to the rolling element at a temperature of 180 to 250° C. By conducting the tempering treatment at the temperature of 180 to 250° C., an amount of residual austenite can be decreased, and occurrence of fatigue exfoliation, local change of the composition, minute cracks due to vibration and impact can be prevented. In addition, dimensional change of the rolling element while it is used at high temperature can be depressed, because the amount of the residual austenite can be decreased. The amount of the residual austenite is preferably 10% or less, and more desirably, 7% or less, or further 4% or less.

DETAILED DESCRIPTION OF PREFERRED EMBODIMENTS

Figure 1:
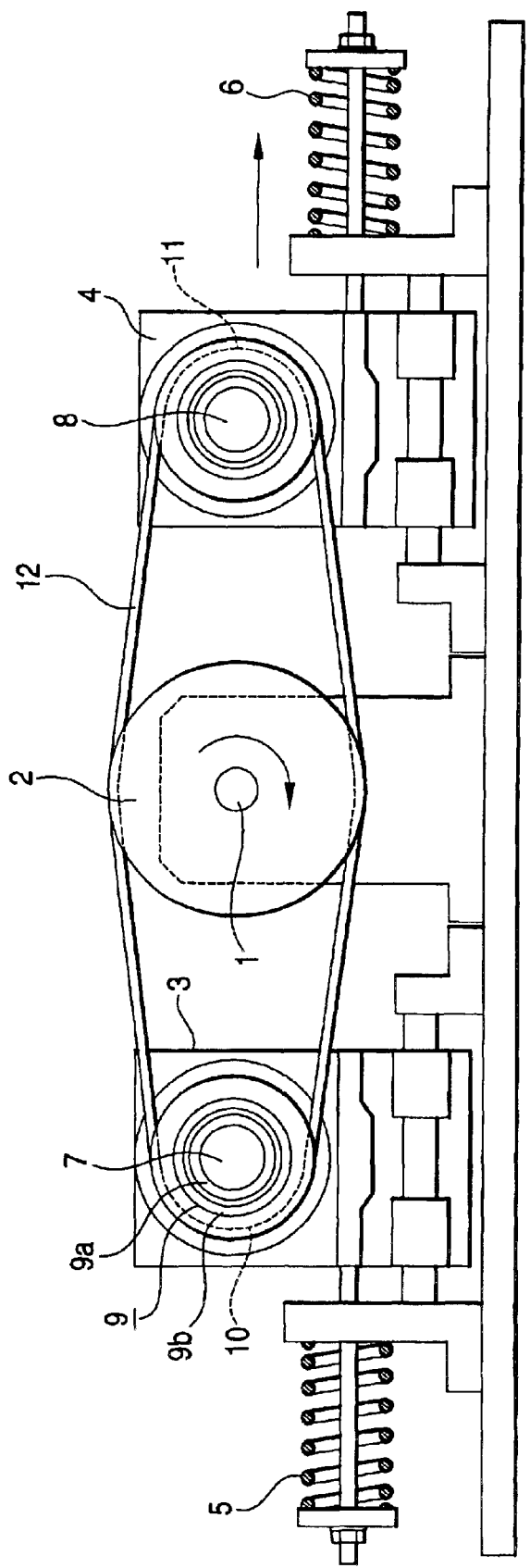
FIG. 1 is a front view of the apparatus for the rapid acceleration and deceleration tests which has been employed in the evaluation tests of the examples and the comparative examples.

Specific examples of this invention will be described below with reference to comparative examples.

EXAMPLES 1 TO 4 AND COMPARATIVE EXAMPLES 1 TO 5

A plurality of semi-finished products in a form of ball having a diameter of ⅜ inches have been produced according to JIS SUJ2, and then, these semi-finished products have been subjected to an annealing treatment in which they are rapidly cooled after heated for 35 minutes at 850° C., and to a tempering treatment in which they are maintained for two hours at different temperatures. Then, a plurality of the semi-finished products which had been heat treated were put into a rotary drum, and a surface hardening treatment was applied to the semi-finished products by rotating the rotary drum at a required rotation speed for a required period. Control of the surface hardness was performed by appropriately varying the rotation speed of the rotary drum and the treating period. Thereafter, a finishing treatment such as polishing was conducted and finished products in a form of ball having a diameter of ⅜ inches have been obtained. Then, each of the balls has been cut into halves and hardness at its center part has been measured to obtain the hardness in the interior of the ball. Further, after each of the balls has been cut into halves, dispersion of the hardness in a radial direction from the surface up to a depth of 1 mm has been measured at a pitch of 0.02 mm, and the highest hardness among values obtained is determined to be the surface hardness. The results are shown in Table 1 together with the tempering temperatures, the amounts of residual austenite, the largest diameter of the inclusions of alumina group, the largest diameter of the inclusions of titanium group (titanium nitride), and the largest diameter of the spherical carbide.

Evaluation Tests:

With respect to a test bearing called as a nominal type number 6304 into which the balls of Examples 1 to 4 and Comparative Examples 1 to 5 had been incorporated, rapid acceleration and deceleration tests have been conducted employing a test apparatus for an engine auxiliary equipment as shown in FIG. 1. In FIG. 1, the apparatus for the rapid acceleration and deceleration tests includes a pulley 2 fixed to a drive shaft 1 which is rotatably driven by a motor (not shown), movable bases 3 and 4 which are arranged on both sides of the drive shaft 1 spaced therefrom and movable in a lateral direction, helical compression springs 5 and 6 adapted to respectively bias the movable bases 3 and 4 outwardly in a lateral direction, and fixed shafts 7 and 8 respectively fixed to the movable bases 3 and 4. An inner ring 9a of the test bearing 9 has been fixed around the fixed shaft 7 of the movable base 3 on the left side, and then, a pulley 10 has been fixed around an outer ring 9b. Further, a pulley 11 is provided so as to rotate around the fixed shaft 8 of the movable base 4 on the right side, and a V-belt 12 has been wound around the three pulleys 2, 10, and 11. Load (belt tension) applied on this occasion was set to be 980N. In this state, acceleration from 9000 rpm to 180000 rpm for 0.5 seconds and deceleration from 180000 rpm to 9000 rpm for 0.5 seconds have been repeatedly conducted. The results are also shown in Table 1.

TABLE 1

| | Tempering temperature ° C. | Surface hardness (HV) | | Interior hardness HV | Amount of residual austenite % (Vol.) | Largest diameter μm | | | Results |
| | | Measured value | Depth from surface | | | Alumina group inclusion | Ti-group inclusion | Spherical carbide | |
|---|---|---|---|---|---|---|---|---|---|
| Example 1 | 180 | 815 | 3% of diameter | 748 | 7.3 | 15 | 15 | 0.5 | Discontinued after 500 hours |
| Example 2 | 190 | 807 | 4% of diameter | 745 | 6.4 | 30 | 20 | 0.4 | Discontinued after 500 hours |
| Example 3 | 210 | 796 | 4% of diameter | 738 | 3.9 | 25 | 10 | 0.5 | Discontinued after 500 hours |
| Example 4 | 250 | 782 | 8% of diameter | 720 | 0 | 30 | 22 | 0.5 | Discontinued after 500 hours |
| Comparative Example 1 | 130 | 890 | 1% of diameter | 810 | 10.2 | 14 | 18 | 0.3 | Exfoliated after 40 hours |

TABLE 1-continued

|  | Tempering temperature ° C. | Surface hardness (HV) Measured value | Surface hardness (HV) Depth from surface | Interior hardness HV | Amount of residual austenite % (Vol.) | Largest diameter μm Alumina group inclusion | Largest diameter μm Ti-group inclusion | Largest diameter μm Spherical carbide | Results |
|---|---|---|---|---|---|---|---|---|---|
| Comparative Example 2 | 160 | 870 | 2% of diameter | 807 | 8.5 | 26 | 12 | 0.5 | Exfoliated after 83 hours |
| Comparative Example 3 | 180 | 895 | 5% of diameter | 740 | 6.5 | 30 | 9 | 0.4 | Exfoliated after 110 hours |
| Comparative Example 4 | 160 | 825 | 2% of diameter | 810 | 10.5 | 23 | 20 | 0.3 | Exfoliated after 90 hours |
| Comparative Example 5 | 160 | 870 | 3% of diameter | 815 | 7.5 | 35 | 25 | 0.5 | Exfoliated after 180 hours |

As apparent from Table 1, the useful life of the rolling bearing according to the present invention employing the balls in which the interior hardness is 620 to 750 HV, the hardest point exists within the depth of 10% of the diameter from the rolling surface, and the hardness at this point is made higher by 20 to 150 HV than the interior hardness has become far longer than that of the comparative examples.

What is claimed is:

1. A rolling bearing comprising:
a rolling element made of steel, having a hardness of 620 to 750 HV in the interior thereof, wherein a hardest point thereof exists within a depth of 10% of its diameter from a rolling contact surface of the rolling element, and the hardness at the hardest point is higher by 20 to 150 HV than the hardness in the interior and is at least 782 HV.

2. A rolling bearing comprising:
a rolling element made of steel, having a hardness of 620 to 750 HV in the interior thereof, wherein a hardest point thereof exists within a depth of 10% of its diameter from a rolling contact surface of the rolling element, and the hardness at the hardest point is higher by 20 to 150 HV than the hardness in the interior,
wherein the rolling element contains alumina and titanium nitride respectively having a largest diameter of 30 μm or less.

3. A rolling bearing comprising:
a rolling element made of steel, having a hardness of 620 to 750 HV in the interior thereof, wherein a hardest point thereof exists within a depth of 10% of its diameter from a rolling contact surface of the rolling element, and the hardness at the hardest point is higher by 20 to 150 HV than the hardness in the interior,
wherein the rolling element contains spherical carbide having a largest diameter of 0.5 μm or less.

4. The rolling bearing according to claim 1, wherein a tempering treatment is applied to the rolling element at a temperature of 180 to 250° C.

5. The rolling bearing according to claim 3, wherein a tempering treatment is applied to the rolling element at a temperature of 180 to 250° C.

6. The wiling bearing according to claim 5, wherein the rolling element has no more than 10% residual austenite.

7. The rolling bearing according to claim 5, wherein the rolling element has no more than 7% residual austenite.

8. The rolling bearing according to claim 5, wherein the rolling element has no more than 4% residual austenite.

9. The rolling bearing according to claim 2, wherein the rolling element contains spherical carbide having a largest diameter of 0.5 μm or less.

10. The rolling bearing according to claim 2, wherein a tempering treatment is applied to the rolling element at a temperature of 180 to 250° C.

11. The rolling bearing according to claim 9, wherein a tempering treatment is applied to the rolling element at a temperature of 180 to 250° C.

12. The rolling bearing according to claim 11, wherein the rolling element has no more than 10% residual austenite.

13. The rolling bearing according to claim 11, wherein the rolling element has no more than 7% residual austenite.

14. The rolling bearing according to claim 11, wherein the rolling element has no more than 4% residual austenite.

* * * * *